(12) United States Patent
Wang et al.

(10) Patent No.: US 12,028,400 B2
(45) Date of Patent: *Jul. 2, 2024

(54) INITIAL BITRATE FOR REAL TIME COMMUNICATION

(71) Applicant: Google LLC, Mountain View, CA (US)

(72) Inventors: Ying Wang, Stockholm (SE); Christoffer Rodbro, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,645

(22) Filed: Jul. 14, 2022

(65) Prior Publication Data

US 2023/0007069 A1 Jan. 5, 2023

Related U.S. Application Data

(63) Continuation of application No. 16/853,909, filed on Apr. 21, 2020, now Pat. No. 11,425,184.

(51) Int. Cl.
*H04N 23/00* (2023.01)
*G06F 16/28* (2019.01)
(Continued)

(52) U.S. Cl.
CPC ............ *H04L 65/80* (2013.01); *G06F 16/285* (2019.01); *H04L 65/762* (2022.05);
(Continued)

(58) Field of Classification Search
CPC ..... H04L 65/80; H04L 65/602; H04L 65/607; H04L 65/1069; G06F 16/285;
(Continued)

(56) References Cited

U.S. PATENT DOCUMENTS 9,264,780 B1 * 2/2016 Stoica ................ H04N 21/6332
9,549,043 B1 * 1/2017 Stoica .................. H04L 65/612
(Continued)

FOREIGN PATENT DOCUMENTS

CN 106056802 A 10/2016
CN 111447471 7/2020

*Primary Examiner* — Frank F Huang
(74) *Attorney, Agent, or Firm* — DORITY & MANNING P.A.

(57) ABSTRACT

A method for determining an initial bitrate for a communication includes receiving a communication request to establish a digital communication between a first user device and a second user device associated with a plurality of features including a geographical identifier identifying a geographical location associated with the first user device, a first network type connection associated with the first user device, a second network type connection associated with the second user device, and an average bitrate for a previous digital communication of the first user device. The method includes determining, using an initial bitrate predictor model configured to receive the plurality of features as feature inputs, an initial bitrate for the digital communication between the first user device and the second user device, and establishing the digital communication between the first user device and the second user device at the determined initial bitrate.

20 Claims, 9 Drawing Sheets

(51) Int. Cl.
   *H04L 65/75*       (2022.01)
   *H04L 65/80*       (2022.01)
   *H04N 19/149*      (2014.01)
   *H04N 21/2662*     (2011.01)
   *H04W 4/029*       (2018.01)
   *H04W 28/08*       (2023.01)

(52) U.S. Cl.
   CPC ....... *H04N 19/149* (2014.11); *H04N 21/2662* (2013.01); *H04W 4/029* (2018.02); *H04W 28/0967* (2020.05)

(58) Field of Classification Search
   CPC ............. H04N 19/149; H04N 21/2662; H04N 19/146; H04W 4/029; H04W 28/0967
   See application file for complete search history.

(56) References Cited

U.S. PATENT DOCUMENTS

| | | |
|---|---|---|
| 2018/0124146 A1 | 5/2018 | Chen et al. |
| 2018/0131593 A1* | 5/2018 | Jain .................. H04L 12/66 |
| 2018/0302455 A1 | 10/2018 | Bordoloi |
| 2019/0182512 A1* | 6/2019 | Bhooi ................ H04L 65/60 |
| 2019/0342597 A1* | 11/2019 | Li .................... H04N 21/2402 |
| 2020/0015121 A1 | 1/2020 | Misra et al. |
| 2020/0236372 A1 | 7/2020 | Reznik et al. |
| 2020/0296362 A1* | 9/2020 | Chadwick ........... H04N 19/149 |
| 2021/0021494 A1* | 1/2021 | Yao ................... H04L 41/147 |
| 2021/0329057 A1* | 10/2021 | Wang .................. H04W 4/029 |

* cited by examiner

| Bitrate Bucket | 0 (50 kbps) | 1 (100 kbps) | 2 (150 kbps) | 3 (300 kbps) | 4 (500 kbps) | 5 (1000 kbps) |
|---|---|---|---|---|---|---|
| Probability | 0.15 | 0.2 | 0.35 | 0.2 | 0.1 | 0.0 |
| Accumulated Probability | 1.0 | 0.85 | 0.65 | 0.3 | 0.1 | 0 |

FIG. 5B

| Bitrate Bucket | 0 (50 kbps) | 1 (100 kbps) | 2 (150 kbps) | 3 (300 kbps) | 4 (500 kbps) | 5 (1000 kbps) |
|---|---|---|---|---|---|---|
| Confidence Threshold | 0 | 0.5 | 0.6 | 0.7 | 0.8 | 0.9 |

FIG. 5C

INITIAL BITRATE FOR REAL TIME COMMUNICATION

CROSS REFERENCE TO RELATED APPLICATIONS

This U.S. patent application is a continuation of, and claims priority under 35 U.S.C. § 120 from, U.S. patent application Ser. No. 16/853,909, filed on Apr. 21, 2020. The disclosure of this prior application is considered part of the disclosure of this application and is hereby incorporated by reference in its entirety.

TECHNICAL FIELD

This disclosure relates to establishing an initial bitrate for real time communication.

BACKGROUND

Audio and video communications over digital networks has become widespread and the quality of these communication is in large part controlled by the bitrate. The bitrate is the number of bits that are communicated over the communication channel per unit of time (e.g., kbit/s or kbps). The higher the bitrate, the more bits that are communicated in the same given time, and the greater the quality. However, a bitrate that exceeds the available bandwidth of the communication channel can significantly degrade communications by causing delays as sufficient data is buffered. When initiating real-time communication, an initial bitrate must be chosen. Typically, the initial bitrate is a predetermined fixed value. Because of a wide variety of user and network conditions, the fixed bitrate may not be an ideal value.

SUMMARY

One aspect of the disclosure provides a method for determining an initial bitrate of real time communication. The method includes receiving, at data processing hardware, a communication request to establish a digital communication between a first user device and a second user device. The communication request is associated with a plurality of features. The plurality of features include a geographical identifier identifying a geographical location associated with the first user device, a first network type connection associated with the first user device for establishing the digital communication with the second user device, a second network type connection associated with the second user device for establishing the digital communication with the first user device, and an bitrate (e.g., an average bitrate, a median bitrate, etc.) for a previous digital communication of the first user device. The method also includes determining an initial bitrate predictor model configured to receive the plurality of features as feature inputs, an initial bitrate for the digital communication between the first user device and the second user device. The method also includes establishing the digital communication between the first user device and the second user device at the determined initial bitrate.

Implementations of the disclosure may include one or more of the following optional features. In some implementations, the initial bitrate predictor model is trained on a corpus of training communication records. Each training communication record may be associated with a corresponding training digital communication and include a corresponding plurality of features and a corresponding bitrate for the corresponding training digital communication. The geographical identifier, in some examples, includes a select country group from a plurality of country groups. Each country group includes a respective group of countries with similar historical bitrates used for digital communications. Optionally, each country group of the plurality of country groups is based on k-means clustering and/or other clustering algorithms. In some implementations, the first network type connection and the second network type connection each include one of a 2G network, a 3G network, a 4G network, or an unknown network. Optionally, the first network type connection and the second network type connection may include a 5G network, a Wi-Fi network, or Ethernet connection.

In some examples, the first network type connection includes a same type of network connection as the second network type connection. Alternatively, the first network type connection may include a different type of network connections than the second network type connection. In some implementations, the previous digital communication of the first user device includes a most recent digital communication established for the first user device using the first network type connection.

The bitrate of the previous digital communication of the first user device may be represented by a bitrate bucket selected from a plurality of bitrate buckets. Each bitrate bucket in the plurality of bitrate buckets is associated with a respective range of bitrates that does not overlap with the respective range of bitrates associated with any other bitrate bucket in the plurality of bitrate buckets. In some implementations, the method includes translating the initial bitrate predictor model into a lookup table. Determining the initial bitrate for the digital communication may include accessing the lookup table based on the plurality of features. In some examples, the method includes translating the initial bitrate predictor model into a function. Determining the initial bitrate for the digital communication may include using the function to compute the initial bitrate based on the plurality of features.

Optionally, the initial bitrate predictor model is configured to generate a probability distribution over possible bitrates for the first user device during the digital communication. In some examples, determining the initial bitrate for the digital communication includes selecting a bitrate bucket from among a plurality of bitrate buckets based on the probability distribution over possible bitrates and a utility function based on a rate-distortion curve.

Another aspect of the disclosure provides a system for determining an initial bitrate of real time communication. The system includes data processing hardware and memory hardware in communication with the data processing hardware. The memory hardware stores instructions that when executed on the data processing hardware cause the data processing hardware to perform operations. The operations include receiving, at data processing hardware, a communication request to establish a digital communication between a first user device and a second user device. The communication request is associated with a plurality of features. The plurality of features include a geographical identifier identifying a geographical location associated with the first user device, a first network type connection associated with the first user device for establishing the digital communication with the second user device, a second network type connection associated with the second user device for establishing the digital communication with the first user device, and an bitrate for a previous digital communication of the first user device. The operations also include determining an initial bitrate predictor model configured to receive the plurality of features as feature inputs, an initial bitrate for the digital communication between the first user device and the second user device. The operations also include establishing the digital communication between the first user device and the second user device at the determined initial bitrate.

Implementations of the disclosure may include one or more of the following optional features. In some implementations, the initial bitrate predictor model is trained on a corpus of training communication records. Each training communication record may be associated with a corresponding training digital communication and include a corresponding plurality of features and a corresponding bitrate (e.g., an average or median bitrate) for the corresponding training digital communication. The geographical identifier, in some examples, includes a select country group from a plurality of country groups. Each country group includes a respective group of countries with similar historical bitrates used for digital communications. Optionally, each country group of the plurality of country groups is based on k-means clustering and/or other clustering algorithms. In some implementations, the first network type connection and the second network type connection each include one of a 2G network, a 3G network, a 4G network, or an unknown network. Optionally, the first network type connection and the second network type connection may include a 5G network, a Wi-Fi network, or Ethernet connection In some examples, the first network type connection includes a same type of network connection as the second network type connection. Alternatively, the first network type connection may include a different type of network connections than the second network type connection. In some implementations, the previous digital communication of the first user device includes a most recent digital communication established for the first user device using the first network type connection.

The bitrate of the previous digital communication of the first user device may be represented by a bitrate bucket selected from a plurality of bitrate buckets. Each bitrate bucket in the plurality of bitrate buckets is associated with a respective range of bitrates that does not overlap with the respective range of bitrates associated with any other bitrate bucket in the plurality of bitrate buckets. In some implementations, the operations include translating the initial bitrate predictor model into a lookup table. Determining the initial bitrate for the digital communication may include accessing the lookup table based on the plurality of features. In some examples, the operations include translating the initial bitrate predictor model into a function. Determining the initial bitrate for the digital communication may include using the function to compute the initial bitrate based on the plurality of features.

Optionally, the initial bitrate predictor model is configured to generate a probability distribution over possible bitrates for the first user device during the digital communication. In some examples, determining the initial bitrate for the digital communication includes selecting a bitrate bucket from among a plurality of bitrate buckets based on the probability distribution over possible bitrates and a utility function based on a rate-distortion curve.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 5B and 5C are tables of bitrate buckets.

Like reference symbols in the various drawings indicate like elements.

DETAILED DESCRIPTION

The overall quality of digital communication is largely impacted by the bitrate of the communication. The bitrate is the number of bits that are communicated per unit of time (e.g., kbps or Mbps). Because the higher the bitrate, the greater the quality of communication, a high bitrate is generally preferred. However, a bitrate that exceeds the available bandwidth of the communication channel can significantly degrade communications by causing delays and freezes as using a bitrate that exceeds the channel capacity leads to buffering and eventually packet drops in network routers. In typical communications, a predetermined fixed value is used to establish an initial bitrate. When the initial bitrate is set too low (i.e., well below the bandwidth of the communication link), the quality of the communication will be artificially low (e.g., a large number of audio or visual artifacts, low resolution, etc.). Alternatively, when the initial bitrate is set too high (i.e., above what the bandwidth of the communication link can support), significant delays or freezing may occur. Thus, an initial bitrate that more accurately reflects the available bandwidth of the communication link between the parties is desirable.

Implementations herein are directed toward an initial bitrate determiner that determines an initial transmit bitrate for a user device establishing digital communication with another user device. The initial bitrate determiner includes an initial bitrate predictor model that generates a probability density function for an average bitrate of a digital communication between a first user device and a second user device. The initial bitrate determiner samples the probability density function to determine an initial bitrate for the digital communication and establishes the digital communication between the first user device and the second user device at the determined initial bitrate.

Figure 1:
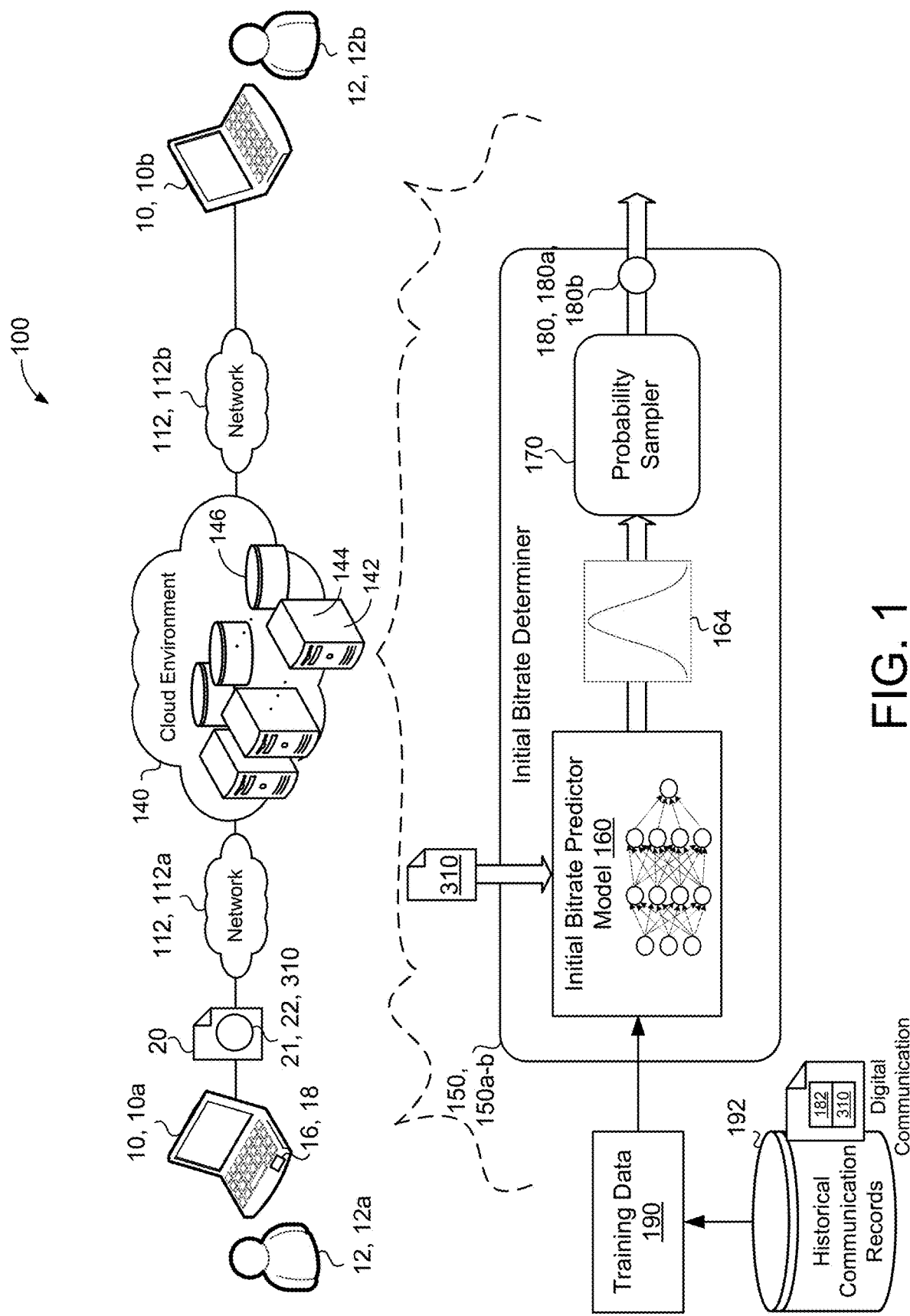
FIG. 1 is a schematic view of an example system for determining an initial bitrate of a real time communication.

Referring to FIG. 1, in some implementations, an example system 100 includes two or more user devices 10, 10a—n, each associated with a respective user 12, 12a—n and each in communication with a remote system 140 via a network 112, 112a—n. The user devices 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The remote system 140 may be a single computer, multiple computers, or a distributed system (e.g., a cloud environment) having scalable/elastic computing resources 144 (e.g., data processing hardware) and/or storage resources 142 (e.g., memory hardware). A data store 146 (i.e., a remote storage device 146) may be overlain on the storage resources 142 to allow scalable use of the storage resources 142 by one or more of the client or computing resources 144. The remote system 140 is configured to receive and transmit a video and/or voice data signal, such as that associated with a Voice over Internet Protocol (VoIP) call or a video chat application, between user devices 10, 10a—b through the networks 112, 112a—b. Therefore, a first caller 12a using a first user device 10a may place a phone call or video call (e.g., send a communication request 21) to a second user device 10b through remote system 140. The user devices 10, 10a—b communicate by sending a digital communication data signal through the network 112, 112a—b to the remote system 140. The communication data signal is split into a series of packets 20, via, for example, the TCP/IP or UDP protocol, with each packet 20 including representations of one or more audio/video samples 22 of the communication signal from the respective user device 10.

The remote system 140 or each user device 10 executes an initial bitrate determiner 150 prior to establishing a digital communication between the first user device 10a and the second user device 10b to determine an initial bitrate 180 for each user device 10. In some examples, the initial bitrate 180 is an initial transmit bitrate 180, as upload bandwidth tends to be lower than download bandwidth for most users 12. That is, the initial transmit bitrate 180 determines the bitrate at which the corresponding user device 10 will transmit digital communication (i.e., packets 20) to the other user device 10 at the start of the digital communication. In some implementations, the remote system 140 determines an initial bitrate 180 for each user device 10 independently. The remote system 140 may also determine the same initial bitrate 180 for each user device 10. In other examples, each user device 10 executes an independent initial bitrate determiner that determines a corresponding independent initial bitrate 180. For example, prior to establishing a digital communication, an initial bitrate determiner 150a executing on the first user device 10a determines an initial bitrate 180a for transmissions from the first user device 10a while simultaneously an initial bitrate determiner 150b executing on the second user device 10b determines an initial bitrate 180b for transmissions from the second user device 10b.

The initial bitrate determiner 150 uses an initial bitrate predictor model 160 to determine the initial bitrate 180 for each user device 10. In some implementations, the initial bitrate predictor model 160 is trained on training data 190 generated from a corpus of training communication records 192, each training communication record 192 associated with a corresponding training digital communication and including a corresponding plurality of features 310 and a corresponding actual bitrate (e.g., the average bitrate, the median bitrate, etc.) for the corresponding training digital communication. That is, the initial bitrate predictor model 160 may be trained on training data 190 that includes historical training communication records 192 with features 310 and the corresponding actual bitrate for the corresponding digital communication. The actual bitrate may have any sort of appropriate statistical association with the historical training communication, such as the average bitrate, the median bitrate, or other representations.

Figure 2A:
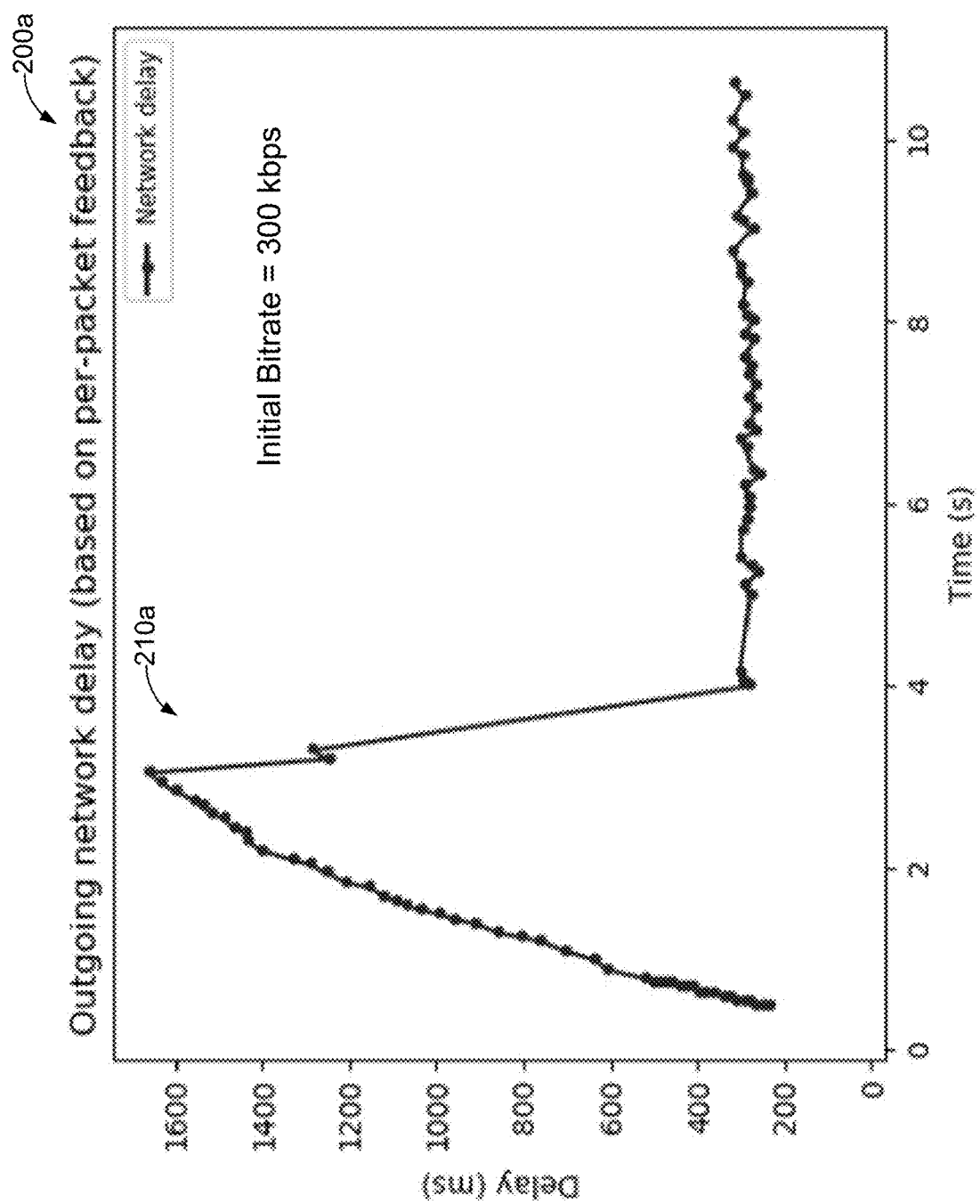
FIG. 2A is a schematic view of a plot of outgoing delay network with an initial bitrate that exceeds a maximum bandwidth of a communication channel.
Figure 2B:
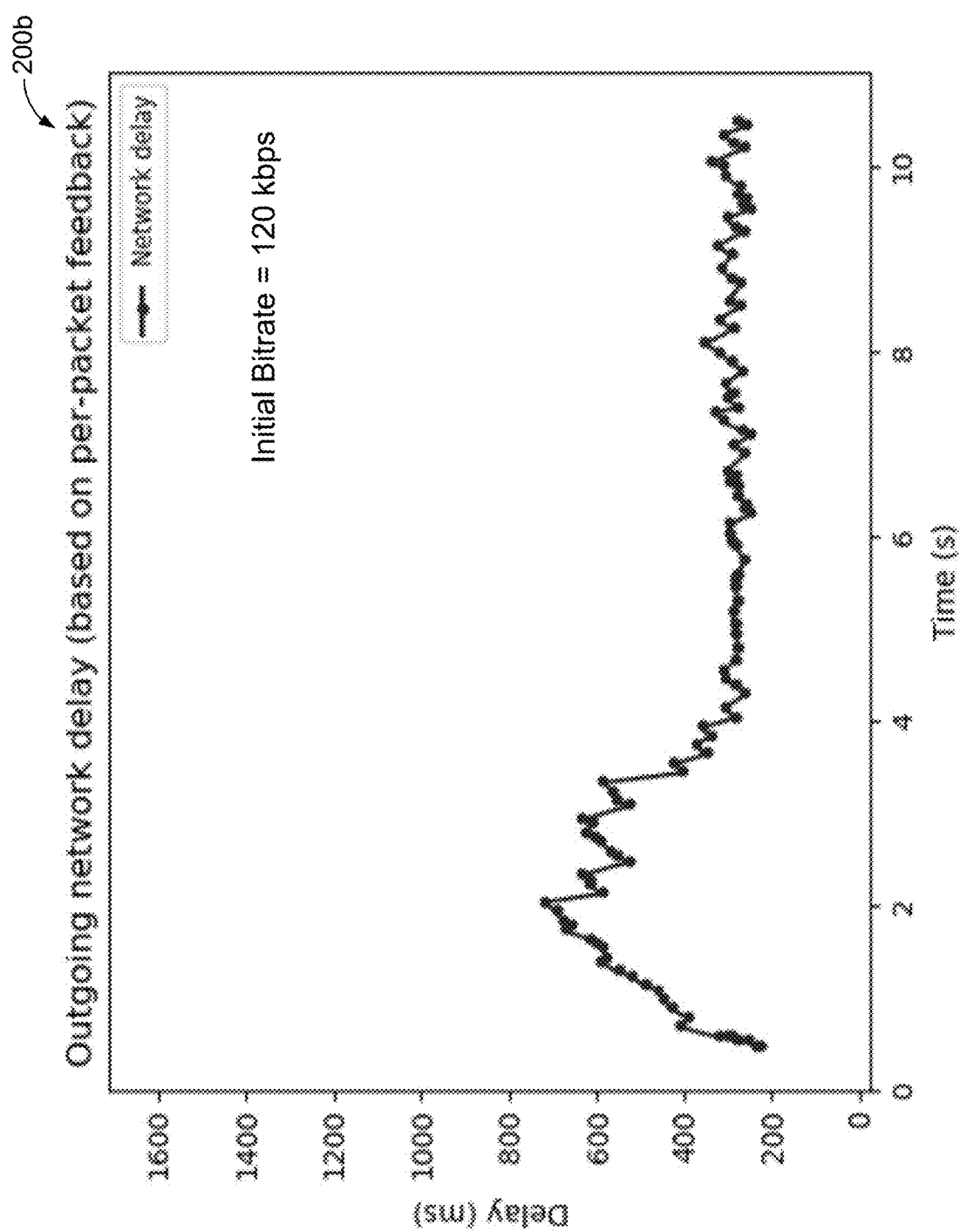
FIG. 2B is a schematic view of a plot of outgoing delay network with an initial bitrate that matches a maximum bandwidth of a communication channel.

Referring now to FIGS. 2A and 2B, typically digital communication services use a predetermined fixed value for the initial bitrate. However, due to the wide variety of network conditions and user devices, the predetermined fixed value is often suboptimal. While the digital communication service may eventually respond to the suboptimal initial bitrate by adjusting the bitrate accordingly, the users may still experience communication degradation (e.g., video freezes, delays in starting communication, etc.) until the adjustment is made. FIGS. 2A and 2B illustrate respective transmission bitrate plots 200a, 200b each having an x-axis representing time (in seconds) and a y-axis representing transmission bitrate (in kilobits per second (kbps)) of a digital communication. In the plot 200a of FIG. 2A, the initial predetermined bitrate is 300 kbps, but the upload link for the transmitting user device is only 120 kbps. Because of this bottleneck, the plot 200a demonstrates a significant network delay spike 210a immediately after communication is established as packets are queued to use the upload link. In contrast, the plot 200b of FIG. 2 shows the initial bitrate set to 120 kbps to result in no significant network delay spike as the upload link is able to keep pace with the transmission bitrate. Minor delay spikes may occur due to encoders not strictly following the initial bitrate and thus causing the actual bitrate to be slightly higher, thus causing some delay.

Referring back to FIG. 1, the initial bitrate predictor model 160 receives the packet 20 including the communication request 21 and a plurality of features 310 associated with the communication request. In some examples, audio/video samples 22 in the packet 20 are preprocessed to improve the quality of the data prior to or after feature extraction. The plurality of features 310, as described in more detail below, define a plurality of characteristics of the digital communication (e.g., network types). The model 160 may be a neural network or other algorithms, e.g., a decision tree, a logistic regression, a recurrent neural network (RNN), a long short-term memory (LSTM), a deep feed forward (DFF) or any other type of neural network or algorithm. The model 160, in some examples, generates a probability distribution 164 over all possible average bitrates for the respective user device 10 during the digital communication. That is, because the average bitrate of the digital communication is likely a good representation of channel capacity (i.e., the upload bandwidth of the communication channel between the first user device and the second user device), the probability distribution 164 generates a probability for each potential average bitrate of the communication in a set of average bitrates. Each average bitrate in the set includes a respective probability that it will be the average bitrate of the digital communication (i.e., the average bitrate of the entirety of the digital communication). Put another way, the model 160 predicts the average bitrate of the forthcoming digital communication between the first user device 10a and the second user device 10b. Other statistical representations may be used instead of the average (e.g., the median). The set of average bitrates includes a minimum average bitrate (e.g., 100 kbps) and a maximum average bitrate (e.g., 5 mbps) and each other average bitrate in the set are distributed between the minimum average bitrate and the maximum average bitrate. Each average bitrate in the set of average bitrates may represent a range of bitrates (e.g., 100 kbps to 300 kbps).

A probability sampler 170 receives the probability distribution 164 (i.e., the probability density function 164) and samples a value (e.g., via direct sampling, mean sampling, mode sampling, tempered sampling, etc.) to determine the initial bitrate 180. For example, the probability sampler 170 samples the average bitrate from the probability distribution 164 that has the highest probability. The probability sampler 170 may also sample values other than the most likely. For example, the probability sampler 170 selects samples from the probability distribution 164 with a lower probability in order to select a more conservative bitrate to reduce the likelihood of network delays.

After determining the initial bitrate 180 from the probability distribution 164, the user device 10 may establish the digital communication with the other user device 10 at the determined initial bitrate 180. For example, the first user device 10*a* (or the remote system 140) determines a first initial bitrate 180*a* and transmits packets 20 to the second user device 10*b* at the first initial bitrate 180*a*. Similarly, the second user device 10*b* (or the remote system 140) determines a second initial bitrate 180*b* and transmits packets 20 to the first user device 10*a* at the second initial bitrate 180*b*.

Figure 3:
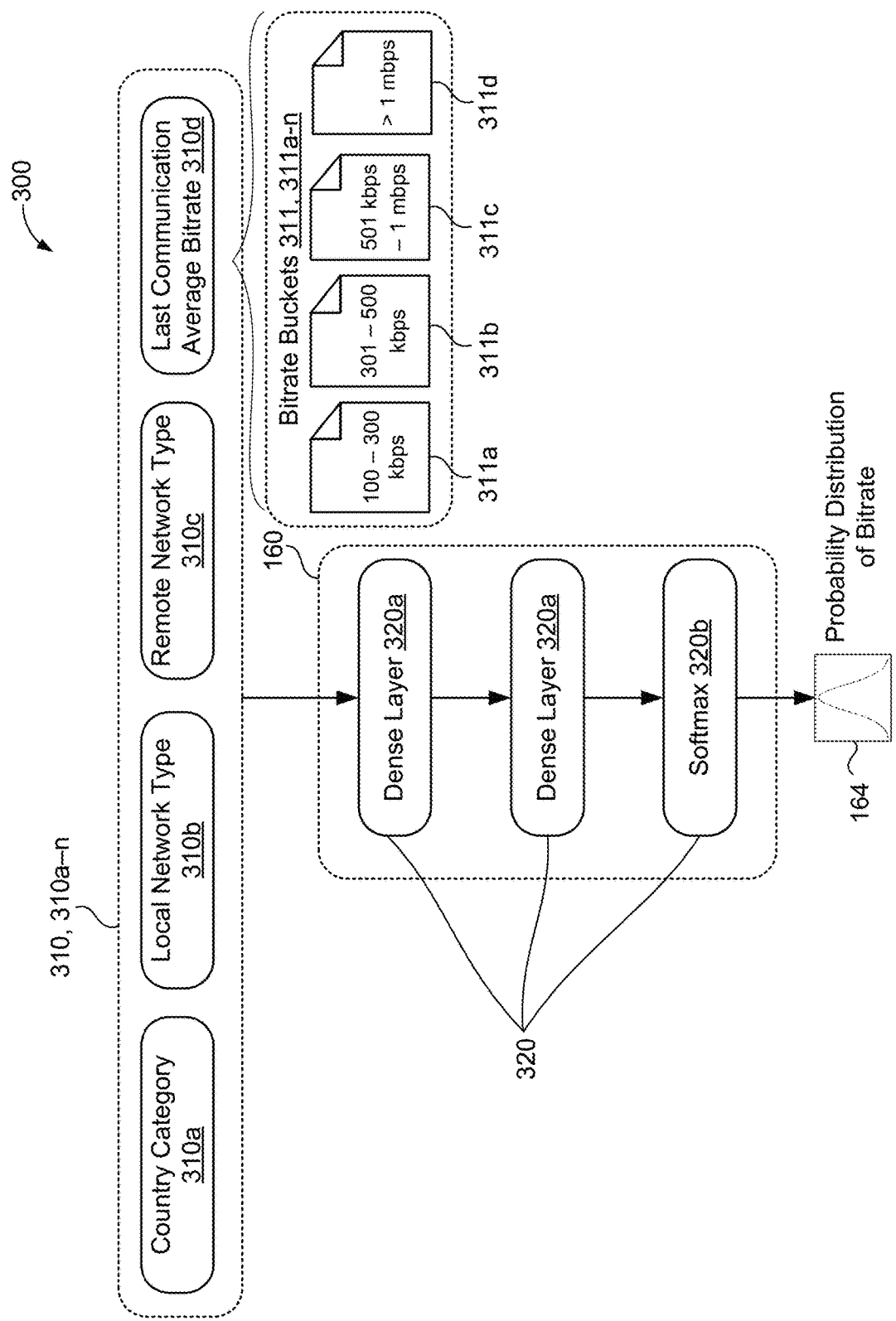
FIG. 3 is a schematic view of exemplary components of an initial bitrate determiner.

Referring now to FIG. 3, the initial bitrate predictor model 160 is configured to receive a plurality of features 310 associated with the digital communication request 21. In some implementations, the plurality of features 310 include a geographical identifier 310*a* (also referred to as a country category 310*a*) identifying a geographical location associated with the respective user device 10. That is, the features 310 may include a country category 310*a* of the respective user device 10. The country category 310*a* indicates the country (i.e., the political state or nation) that the respective user device 10 is currently located in. The geographical identifier 310*a* may be determined via a number of ways (e.g., IP addresses, a GPS signal, etc.).

In some implementations, the geographical identifier 310*a* includes a select country group from a plurality of country groups. Each country group may include a respective group of countries with similar historical average bitrates used for digital communications. That is, instead of having an entry for each potential country, the geographical identifier 310*a* may instead group countries. For example, the countries Canada, the United States, and Mexico are all included in a "Group A" and the geographical identifier 310*a* of any user device located in any of those three countries indicates Group A. Such grouping may greatly reduce the number of possible selections for the geographical identifier 310*a*.

In some implementations, each country group of the plurality of country groups is based on a clustering algorithm (e.g., k-means clustering). For example, when grouping the countries based on similarities in average bitrate, bias is reduced by normalizing the average bitrates of a set of percentiles (e.g., the 10 percentile, the 50 percentile, and the 90 percentile). These normalized percentiles, in some examples, are used as features with different weight for clustering. Using k-means clustering, the initial bitrate determiner 150 may cluster the countries into a plurality of classes or groups (e.g., five groups). Optionally, the initial bitrate determiner 150 includes geographical locations as a further feature to reduce noise.

Other features 310 may include a first (i.e., local) network type connection 310*b* and a second (i.e., remote) network type connection 310*c*. The local network type connection 310*b* may indicate a type of network (e.g., 2G, 3G, 4G, 5G, Wi-Fi, Ethernet, etc.) associated with the respective user device 10 for establishing the digital communication with the other user device 10, while the remote network type connection 310*c* may indicate the type of network that the other user device 10 (i.e., the other user device 10 that the respective user device 10 is establishing digital communication with) is using to establish communication. Optionally, the local network connection type 310*b* and/or the remote network type connection 310*c* may indicate an unknown network type when either network is unable to be identified. In some examples, the local network type connection 310*b* is a same type of network connection as the remote network type connection 310*c*. In other examples, the network type connections 310*b*, 310*c* are different.

In additional examples, the plurality of features 310 include a previous communication average bitrate 310*d*. In some implementations, the previous digital communication average bitrate 310*d* indicates the average bitrate of the most recent or last digital communication using the same local network type 310*b* as the current local network type connection 310*b* for the pending digital communication. The user device 10 and/or the remote system 140 may store in nonvolatile memory (e.g., memory hardware 146) the most recent previous communication average bitrate 310*d* for each network type that the user device 10 uses to establish digital communication with another user device 10. For example, when the user device 10*a* sends a communication request 21 to the remote system 140 via a 3G network (i.e., network 112*a*), the user device 10*a* and/or the remote system 140 determines the average bitrate of the most recent digital communication for the user device 10*a* that used a 3G network. Thus, each user device 10 and/or the remote system 140 may store an average bitrate for each possible network type (e.g., 2G, 3G, 4G, 5G, Wi-Fi, Ethernet, etc.). In some implementations, the plurality of features 310 include a plurality of average bitrates of previous communications 310*d*. In this example, different average bitrates are assigned different weights. For example, a more recent average bitrate is assigned a higher weight and thus have a greater impact than a less recent average bitrate.

With continued reference to FIG. 3, in some implementations, the average bitrate of the previous digital communication 310*d* of a respective user device 10 is represented by a bitrate bucket 311, 311*a*—n selected from a plurality of bitrate buckets 311. In the example shown, there is a bitrate bucket 311*a* for 100 to 300 kbps, a bitrate bucket 311*b* for 301 to 500 kbps, a bitrate bucket 300*c* for 501 kbps to 1 mbps and a bitrate bucket 311*d* for greater than 1 mbps for a total of four bitrate buckets 311*a*—d. These bitrate buckets 311 are exemplary only, and any number of buckets 311 representing any range of bitrates may be used. In one example, the plurality of bitrate buckets 311 includes ten bitrate buckets 311. Each bitrate bucket 311 in the plurality of bitrate buckets 311 is associated with a respective range of bitrates that does not overlap with the respective range of bitrates associated with any other bitrate bucket 311 in the plurality of bitrate buckets 311. The bitrate buckets 311 may greatly reduce a number of potential selections for the average bitrate of the previous digital communication 310*d*.

The plurality of features 310 may include other features that are characteristic of the user device 10*a*, the user device 10*b*, or the networks 112*a*, 112*b*. For example, the plurality of features includes additional features that describe the other user device 10*b*. In another example, the plurality of features 310 include a distance between the first user device 10*a* and the second user device 10*b*.

With continued reference to FIG. 3, the initial bitrate predictor model 160 may include one or more layers 320. For example, the model 160 includes two hidden layers. One or more layers may be a fully connected layer (e.g., a dense layer 320*a*). In another example, one or more layers are Softmax layers. Optionally, the model 160 includes other layers (e.g., SVDF layers, bottleneck layers, etc.). The final layer of the model 160, (e.g., a Softmax layer 320*b* in the illustrated example) outputs the probability distribution 164 of potential average bitrates of the digital communication between the first user device 10a and the second user device 10b.

Figure 4:
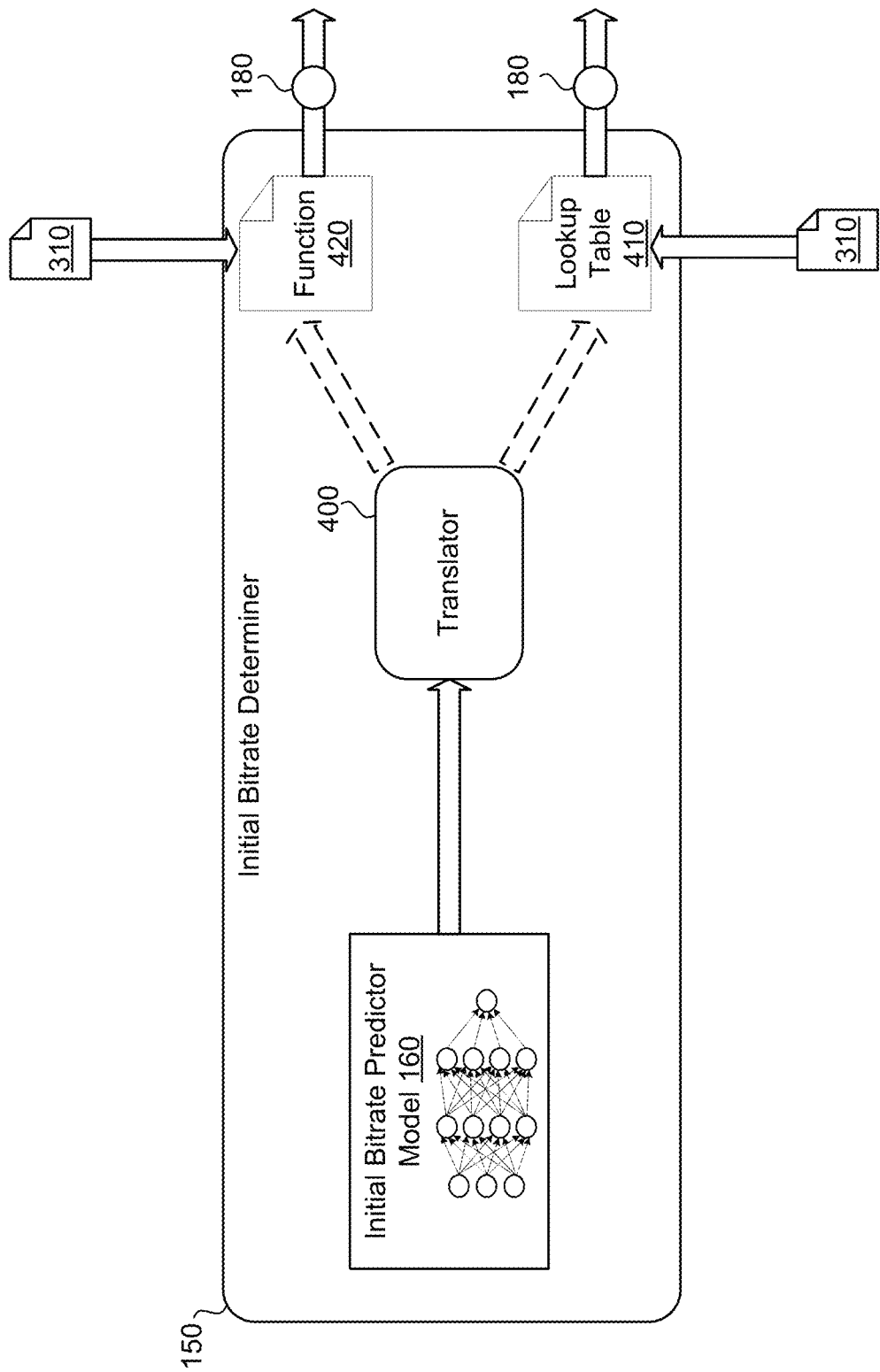
FIG. 4 is a schematic view of additional exemplary components of the initial bitrate determiner.

Referring now to FIG. 4, the initial bitrate determiner 150 may further include a translator 400. The translator 400, in some implementations, translates the initial bitrate predictor model 160 into a lookup table 410. Here, the lookup table 410 includes an array that contains each value that the model 160 is capable of outputting. These values are indexed such that they may be accessed based on the plurality of features 310 and that, when provided the same features 310 as the model 160, the lookup table 410 provides the same or nearly the same output (i.e., initial bitrate 180). That is, after translation by the translator 400, the initial bitrate determiner 150 may bypass the model 160 and determine the initial bitrate 180 for the digital communication by accessing the lookup table 410 based on the plurality of features 310. The lookup table 410 may significantly reduce processing time versus the model 160 while simultaneously reducing storage requirements. In some implementations, the remote system 140 trains the model 160 and translates the model 160 into the lookup table 410 and then transmits the lookup table 410 to the first user device 10a and/or the second user device 10b. The user devices 10 may locally store the lookup table 410 and use the plurality of features 310 associated with a respective communication request 21 to access the lookup table 410 for determining the initial bitrate 180 to use for the digital communication. In another example, the lookup table 410 is stored one the memory hardware 146 of the remote system 140. Here, in response to a communication request, user devices 10 may access the lookup table 410 stored on the memory hardware 146 using a plurality of features 310 associated with communication request 21. Alternatively, the remote system 140 may simply push the appropriate initial bitrate 180 to each user device 10 directly.

In other implementations, the translator 400 translates the initial bitrate predictor model 160 into a function 420. The function 420, when provided with the same inputs as the model 160 (i.e., the plurality of features 310) generates an output (i.e., the initial bitrate) that is the same or substantially the same as the model 160. Thus, after translation by the translator 400, the initial bitrate determiner 150 may bypass the model 160 and determine the initial bitrate 180 for the digital communication by providing the plurality of features 310 as an input to the function 420. The function 420 may be generated in a variety of ways (e.g., curve fitting, etc.).

Figure 5A:
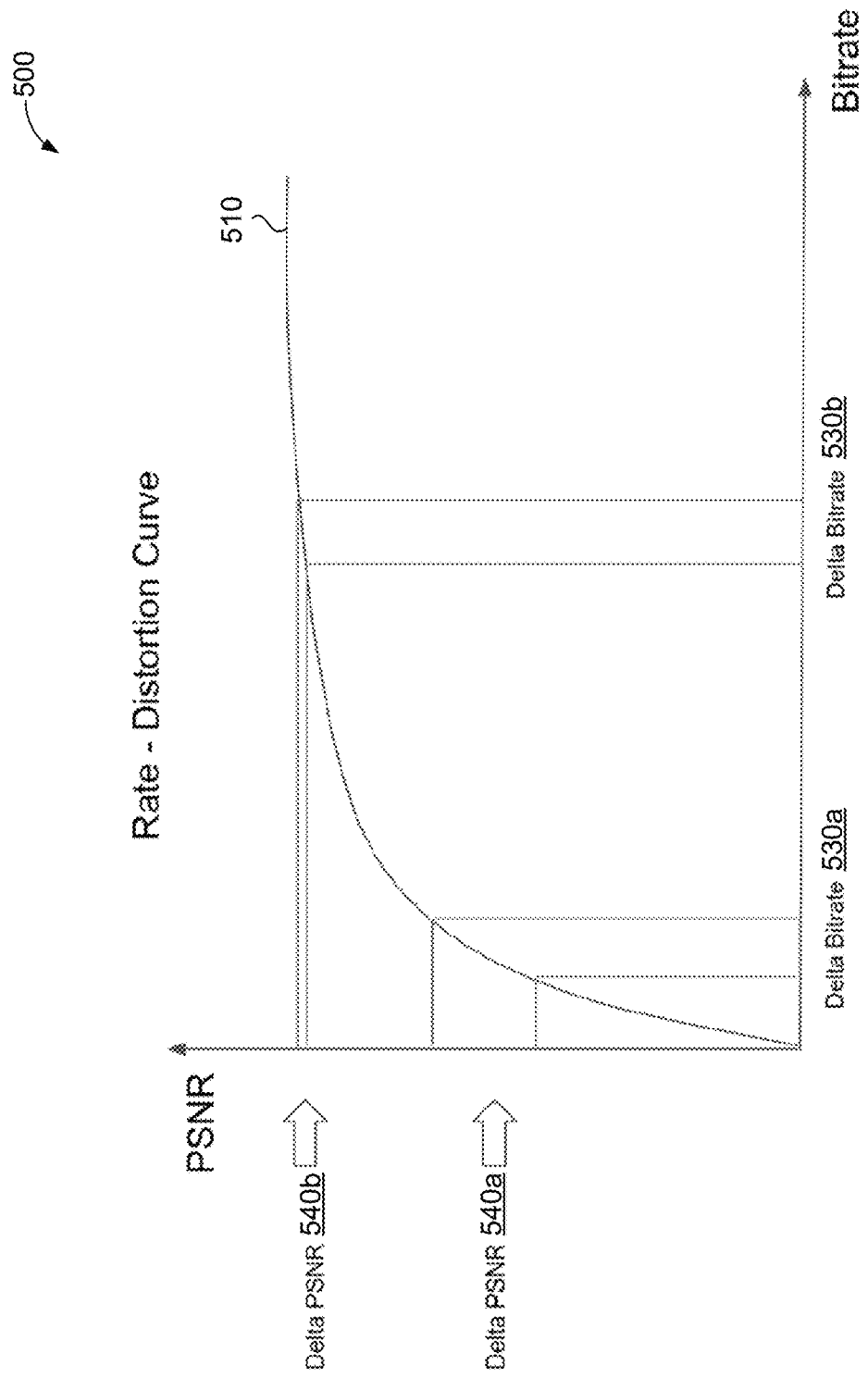
FIG. 5A is a schematic view of a graph of a rate-distortion curve.

In some implementations, it is advantageous to select an initial bitrate that maximizes audio and/or video quality while simultaneously minimizing a risk of overshooting (i.e., selecting a bitrate that exceeds the maximum capacity of networks 112a, 112b). FIG. 5A shows a plot 500 depicting a rate-distortion curve 510 based on bitrate and peak signal-to-noise ratio (PSNR) for a digital communication (e.g., a transmitted and compressed video and/or audio data over a digital communication). The PSNR is a metric commonly used to indicate quality of digital communications, where higher PSNR values are associated with higher quality digital communications. The PSNR may indicate a quality of the compressed video and/or audio data compared to the original (i.e., uncompressed) video and/or audio data. A utility function may generate the rate-distortion curve 510, whereby an x-axis of the plot represents the bitrate and a y-axis of the plot 500 represents the PSNR. In some examples, the initial bitrate determiner 150 determines the initial bitrate 180 for the digital communication between the first user device 10a and the second user device 10b by selecting a bitrate bucket 311 from among a plurality of bitrate buckets 311 based on the probability distribution 164 over possible average bitrates based on the rate-distortion curve 510 (e.g., the same bitrate buckets 311 used to classify the average bitrate of the previous digital communication 310d). That is, the determiner 150 uses the model 160 to generate a probability distribution 164 of possible average bitrates for the respective user device 10 during the digital communication, and then leverages the rate-distortion curve 510 to select the initial bitrate 180 for the digital communication. As will become apparent, the rate-distortion curve 510 may assist in selecting an initial bitrate 180 for the communication that optimizes quality of the digital communication and mitigates a risk in bandwidth overshooting. More specifically, simply selecting an initial bitrate associated with a highest probability in the probability distribution 164 may unduly increase the risk of bandwidth overshooting, whereby the determiner 150 can reference the rate-distortion curve 510 to select a lower value for the initial bitrate 180 that provides similar gains in quality while reducing the risk of bandwidth overshooting.

In one example, the plot 500 shows quality in PSNR of an audio or video communication versus bitrate following the rate-distortion curve 510. Since the rate-distortion curve 510 is not linear, a small change in bitrate when the bitrate is low (and quality is poor) results in a greater increase in quality than a resulting increase in quality when a change in bitrate of the same magnitude occurs when the bitrate is high (and the quality is correspondingly high). As the rate-distortion curve 510 demonstrates, a first delta bitrate change 530a results in a first delta PSNR 540a increase. Similarly, a second delta bitrate change 530b, associated with a same magnitude of change as the first delta bitrate change, results in a second delta PSNR 540b increase. Because the first delta bitrate change 530a occurs at a much lower bitrate than the second delta bitrate change 530b, the first delta PSNR 540a is much larger than the delta PSNR 540b. That is, the first delta bitrate change 530a, despite increasing the bitrate the same magnitude as the second delta bitrate change 530b, provides a greater increase in quality than the delta bitrate change 530b.

In some implementations, the initial bitrate determiner 150 determines the initial bitrate 180 based on the probability distribution 164 and the rate-distortion curve 510 to minimize the risk of overshooting the bitrate of the uplink. As illustrated in the table 550 of FIG. 5B, each bitrate bucket 311 (bitrate buckets 0, 1, 2, 3, 4, and 5 in this example), based on the probability distribution 164, accumulates probability that represents the predicted probability that the current channel bandwidth is greater than the respective bitrate bucket 311. In the example shown, based on an exemplary probability distribution 164, there is a 100-percent chance that the bitrate is greater than bucket 0, an 85 percent chance that the bitrate is greater than bucket 1, a 65-percent chance that the bitrate is greater than bucket 2, etc. In some examples, the initial bitrate determiner 150 defines a confidence threshold and selects a bitrate bucket 311 when the bitrate bucket 311 satisfies the confidence threshold. In the example shown, when the confidence threshold is 75-percent, bitrate bucket 1 is the nearest bitrate bucket 311 that satisfies (e.g., exceeds) the confidence threshold, and thus the initial bitrate determiner 150 selects bucket 1.

In some implementations, the initial bitrate determiner 150 takes an audio and/or video encoder of the user device 10 into consideration. An encoder attempts to generate optimal perceptual communication quality (i.e., minimize distortion) under a set of constraints such as channel bandwidth. An output bitrate of the encoder is dependent upon a quantization step size. The rate-distortion curve 510 (FIG. 5A) may be generated by encoding for all possible quantizers to obtain bitrate and distortion. Due to statistical properties of audio and video signals, the rate-distortion curve is always convex. Based on the rate-distortion curve 510, each bitrate bucket 311 may be assigned an individual bitrate bucket 311. Referring to FIG. 5C, table 560 shows as bandwidth associated with a respective bitrate bucket 311 increases, increasing the corresponding confidence threshold may help improve the tradeoff between gain in quality and risk in bandwidth overshooting.

Figure 6:
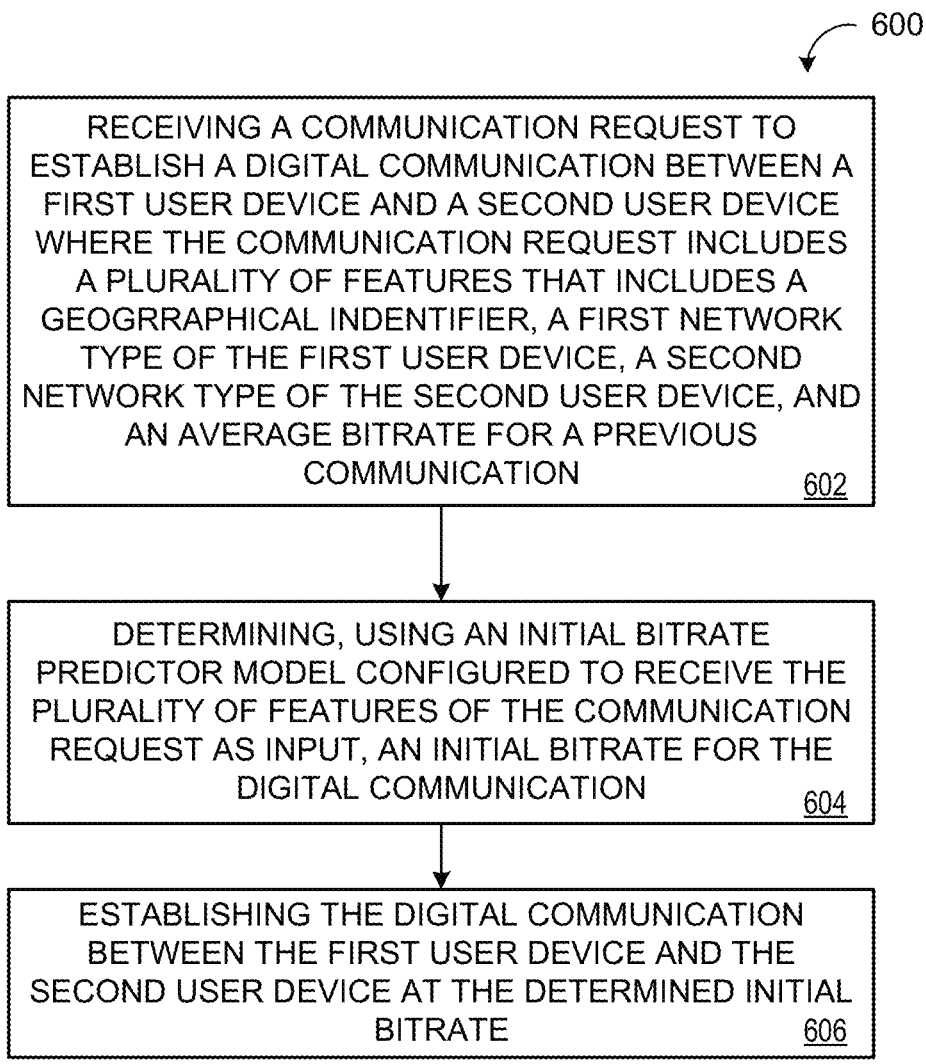
FIG. 6 is a flowchart of an example arrangement of operations for a method of determining an initial bitrate for a real time communication.

FIG. 6 is a flowchart of an exemplary arrangement of operations for a method 600 of determining an initial bitrate for a digital communication between a first user device and a second user device. The method 600 includes, at step 602, receiving, at data processing hardware 18, 144, a communication request 21 to establish a digital communication between a first user device 10a and a second user device 10b. The communication request is associated with a plurality of features 310 that include a geographical identifier 310a identifying a geographical location associated with the first user device 10a. In some examples, the geographical identifier 310a includes a select country group from a plurality of country groups and each country group includes a respective group of countries with similar historical average bitrates used for digital communications. Each country group of the plurality of country groups may be based on k-means clustering.

The plurality of features 310 also includes a first network type connection 310b associated with the first user device 10a for establishing the digital communication with the second user device 10b and a second network type connection 310c associated with the second user device 10b for establishing the digital communication with the first user device 10a. In some implementations, the first network type connection 310b and the second network type connection 310c includes one of a 2G network a 3G network, a 4G network, a 5G network, a Wi-Fi network, an Ethernet connection, an unknown network, etc. The first network type connection 310b may include a same type of network connection as the second network type connection 310c.

The plurality of features 310 also includes an average bitrate for a previous digital communication 310d of the first user device 10a. The previous digital communication, in some examples, includes a most recent digital communication established for the first user device 10a using the first network type connection 310b. Optionally, the average bitrate of the previous digital communication 310d of the first user device 10a is represented by a bitrate bucket 311 selected from a plurality of bitrate buckets 311, and each bitrate bucket 311 in the plurality of bitrate buckets 311 is associated with a respective range of bitrates that does not overlap with the respective range of bitrates associated with any other bitrate bucket 311 in the plurality of bitrate buckets 311.

At step 604, the method 600 includes determining, by the data processing hardware 18, 144, using an initial bitrate predictor model 160 configured to receive the plurality of features 310 as feature inputs, an initial bitrate 180 for the digital communication between the first user device 10a and the second user device 10b. In some implementations, the initial bitrate predictor model 160 is configured to generate a probability distribution 164 over possible average bitrates for the first user device 10a during the digital communication. Determining the initial bitrate 180 for the digital communication may include selecting a bitrate bucket 311 from among a plurality of bitrate buckets 311 based on the probability distribution 164 over possible average bitrates and a plot 500 based on a rate-distortion curve 510. In some examples, the model 160 is trained on a corpus of training communication records 192 that are each associated with a corresponding training digital communication with a corresponding plurality of features 310 and average bitrate 182 (i.e., the actual average bitrate of the corresponding communication). The method also includes, at step 606, establishing, by the data processing hardware 18, 144, the digital communication between the first user device 10a and the second user device 10b at the determined initial bitrate 180.

In some implementations, the method 600 includes translating, by the data processing hardware 18, 144, the initial bitrate predictor model 160 into a lookup table 410 and determining the initial bitrate 180 for the digital communication includes accessing the lookup table 410 based on the plurality of features 310. In some examples, the method 600 includes translating, by the data processing hardware 18, 144, the initial bitrate predictor model 160 into a function 420 and determining the initial bitrate 180 for the digital communication includes using the function 420 to compute the initial bitrate 180 based on the plurality of features 310.

Figure 7:
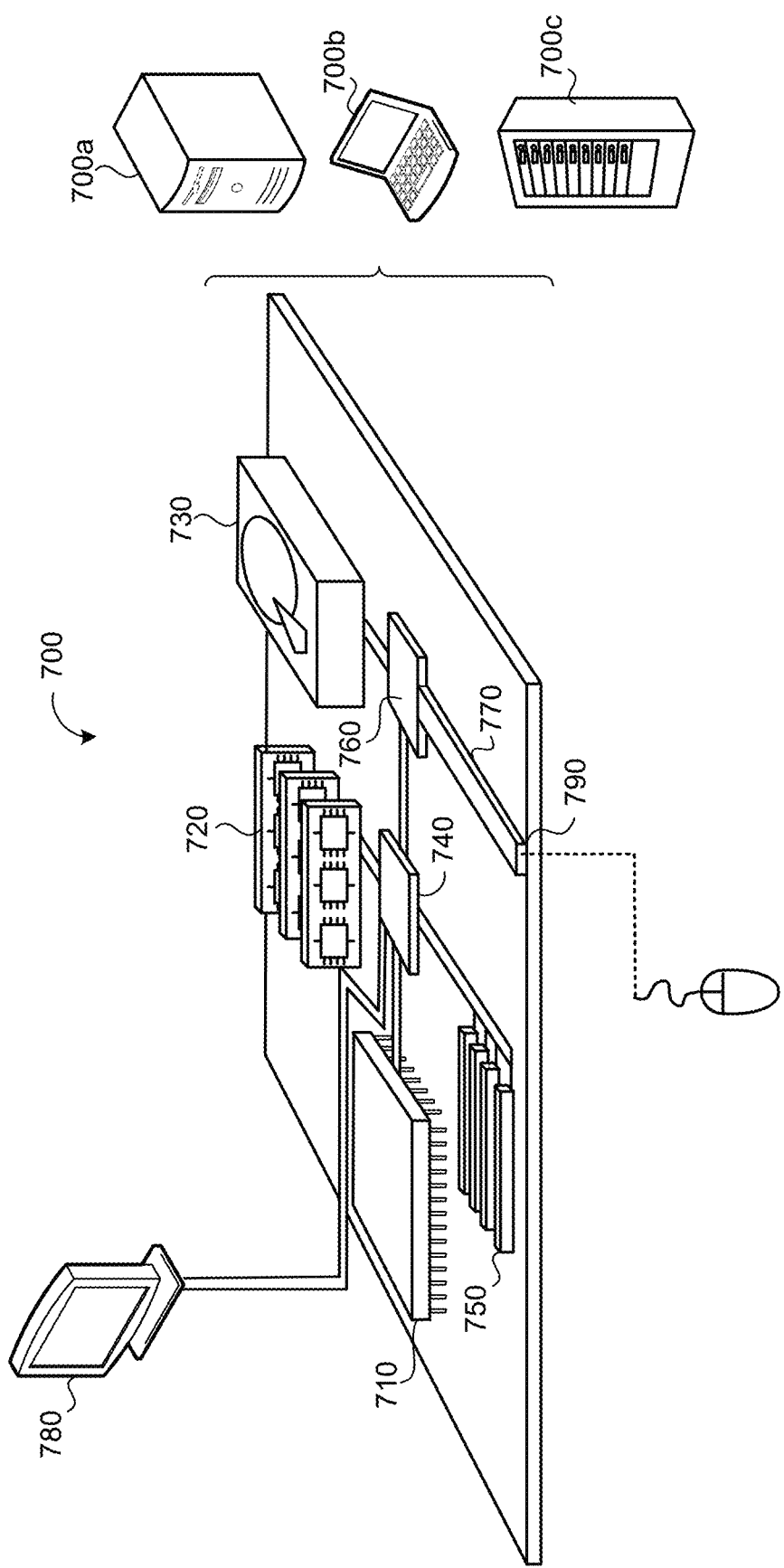
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
receiving a communication request to establish a digital communication between a first user device and a second user device, the communication request associated with a plurality of features associated with the first user device;
determining, using an initial bitrate predictor model configured to receive the plurality of features associated with the first user device as feature inputs, an initial bitrate for the digital communication between the first user device and the second user device, the initial bitrate predictor model comprising a neural network; and
establishing the digital communication between the first user device and the second user device at the determined initial bitrate, the digital communication causing the first user device to transmit communication data to the second user device at the determined initial bitrate.

2. The method of claim 1, wherein the initial bitrate predictor model is trained on a corpus of training communication records, each training communication record associated with a corresponding training digital communication and comprising a corresponding plurality of features and a corresponding bitrate for the corresponding training digital communication.

3. The method of claim 1, wherein the plurality of features comprise an average bitrate for a previous digital communication of the first user device.

4. The method of claim 3, wherein the previous digital communication of the first user device comprises a most recent digital communication established for the first user device using a first network type connection.

5. The method of claim 3, wherein the average bitrate of the previous digital communication of the first user device is represented by a bitrate bucket selected from a plurality of bitrate buckets, each bitrate bucket in the plurality of bitrate buckets associated with a respective range of bitrates that does not overlap with the respective range of bitrates associated with any other bitrate bucket in the plurality of bitrate buckets.

6. The method of claim 1, wherein the plurality of features comprise:
a geographical identifier identifying a geographical location associated with the first user device;
a first network type connection associated with the first user device for establishing the digital communication with the second user device; and
a second network type connection associated with the second user device for establishing the digital communication with the first user device.

7. The method of claim 6, wherein the geographical identifier comprises a select country group from a plurality of country groups, each country group comprising a respective group of countries with similar historical average bitrates used for digital communications.

8. The method of claim 1, wherein the operations further comprise:
translating the initial bitrate predictor model into a lookup table,
wherein determining the initial bitrate for the digital communication comprises accessing the lookup table based on the plurality of features associated with the first user device.

9. The method of claim 1, wherein the operations further comprise:
translating the initial bitrate predictor model into a function,
wherein determining the initial bitrate for the digital communication comprises using the function to compute the initial bitrate based on the plurality of features associated with the first user device.

10. The method of claim 1, wherein:
the initial bitrate predictor model is configured to generate a probability distribution over possible average bitrates for the first user device during the digital communication; and
determining the initial bitrate for the digital communication comprises selecting a bitrate bucket from among a plurality of bitrate buckets based on the probability distribution over possible average bitrates and a rate-distortion curve.

11. A system comprising:
data processing hardware; and
memory hardware in communication with the data processing hardware, the memory hardware storing instructions that when executed on the data processing hardware cause the data processing hardware to perform operations comprising:
receiving a communication request to establish a digital communication between a first user device and a second user device, the communication request associated with a plurality of features associated with the first user device;
determining, using an initial bitrate predictor model configured to receive the plurality of features associated with the first user device as feature inputs, an initial bitrate for the digital communication between the first user device and the second user device, the initial bitrate predictor model comprising a neural network; and
establishing the digital communication between the first user device and the second user device at the determined initial bitrate, the digital communication causing the first user device to transmit communication data to the second user device at the determined initial bitrate.

12. The system of claim 11, wherein the initial bitrate predictor model is trained on a corpus of training communication records, each training communication record associated with a corresponding training digital communication and comprising a corresponding plurality of features and a corresponding bitrate for the corresponding training digital communication.

13. The system of claim 11, wherein the plurality of features comprise an average bitrate for a previous digital communication of the first user device.

14. The system of claim 13, wherein the previous digital communication of the first user device comprises a most recent digital communication established for the first user device using a first network type connection.

15. The system of claim 13, wherein the average bitrate of the previous digital communication of the first user device is represented by a bitrate bucket selected from a plurality of bitrate buckets, each bitrate bucket in the plurality of bitrate buckets associated with a respective range of bitrates that does not overlap with the respective range of bitrates associated with any other bitrate bucket in the plurality of bitrate buckets.

16. The system of claim 11, wherein the plurality of features comprise:
- a geographical identifier identifying a geographical location associated with the first user device;
- a first network type connection associated with the first user device for establishing the digital communication with the second user device; and
- a second network type connection associated with the second user device for establishing the digital communication with the first user device.

17. The system of claim 16, wherein the geographical identifier comprises a select country group from a plurality of country groups, each country group comprising a respective group of countries with similar historical average bitrates used for digital communications.

18. The system of claim 11, wherein the operations further comprise:
- translating the initial bitrate predictor model into a lookup table,
- wherein determining the initial bitrate for the digital communication comprises accessing the lookup table based on the plurality of features associated with the first user device.

19. The system of claim 11, wherein the operations further comprise:
- translating the initial bitrate predictor model into a function,
- wherein determining the initial bitrate for the digital communication comprises using the function to compute the initial bitrate based on the plurality of features associated with the first user device.

20. The system of claim 11, wherein:
- the initial bitrate predictor model is configured to generate a probability distribution over possible average bitrates for the first user device during the digital communication; and
- determining the initial bitrate for the digital communication comprises selecting a bitrate bucket from among a plurality of bitrate buckets based on the probability distribution over possible average bitrates and a rate-distortion curve.

* * * * *